United States Patent [19]
Breunsbach et al.

[11] Patent Number: 5,767,424
[45] Date of Patent: Jun. 16, 1998

[54] WAVE SOLDER ANALYZER

[75] Inventors: Rex L. Breunsbach, Clackamas; Paul M. Austen, Milwaukie, both of Oreg.

[73] Assignee: Electronic Controls Design, Inc., Milwaukie, Oreg.

[21] Appl. No.: 771,478

[22] Filed: Dec. 23, 1996

[51] Int. Cl.$^6$ ................................................. G01N 19/00
[52] U.S. Cl. ............................. 73/865.9; 228/180.1
[58] Field of Search ........................ 73/865.9; 228/180.1, 228/219

[56] References Cited

U.S. PATENT DOCUMENTS

| | | | |
|---|---|---|---|
| 4,180,199 | 12/1979 | O'Rourke et al. | |
| 4,224,744 | 9/1980 | Siegal et al. | 35/13 |
| 4,529,116 | 7/1985 | Gutbier | 228/103 |
| 4,632,291 | 12/1986 | Rahn et al. | 228/9 |
| 5,023,848 | 6/1991 | Frey et al. | |
| 5,180,440 | 1/1993 | Siegel et al. | 136/230 |
| 5,193,912 | 3/1993 | Saunders | 374/179 |
| 5,388,468 | 2/1995 | Sasson | |
| 5,439,160 | 8/1995 | Marcantonio | 228/102 |
| 5,533,663 | 7/1996 | Massini et al. | 228/103 |
| 5,538,175 | 7/1996 | Massini et al. | 228/102 |

OTHER PUBLICATIONS

"Raise Your Quality Expectations," by Technology Information Corporation, 4 pp. (undated).

*Primary Examiner*—Hezron E. Williams
*Assistant Examiner*—Jay L. Politzer
*Attorney, Agent, or Firm*—Klarquist Sparkman Campbell Leigh & Whinston, LLP

[57] ABSTRACT

This patent discloses an analyzer that can be mounted onto a wave solder machine and passed through a solder wave to determine various characteristics associated with the solder wave to assist operators with proper set up and trouble shooting. The analyzer comprises a pallet made of a thermally insulated material. The pallet supports a housing that contains a data collector having its own power supply. The pallet further supports a coupon that is made of circuit board material so that test measurements may be made simulating actual circuit board conditions as closely as possible. The pallet can accept coupons of different circuit board types such as multi-layer or double sided. The pallet further has dissimilar wire pairs embedded therein. The wire pairs have terminal portions strategically exposed along a bottom surface of the pallet located in non-contacting, but close proximity to one another. As the dissimilar wire pairs pass through a solder wave, a thermal emf is generated that can be detected by the data collector. Based upon information sensed by the dissimilar wire pairs, the thermocouples mounted to the coupon, and a timer, the data collector is able to determine substantial physical characteristics associated with the solder wave.

34 Claims, 4 Drawing Sheets

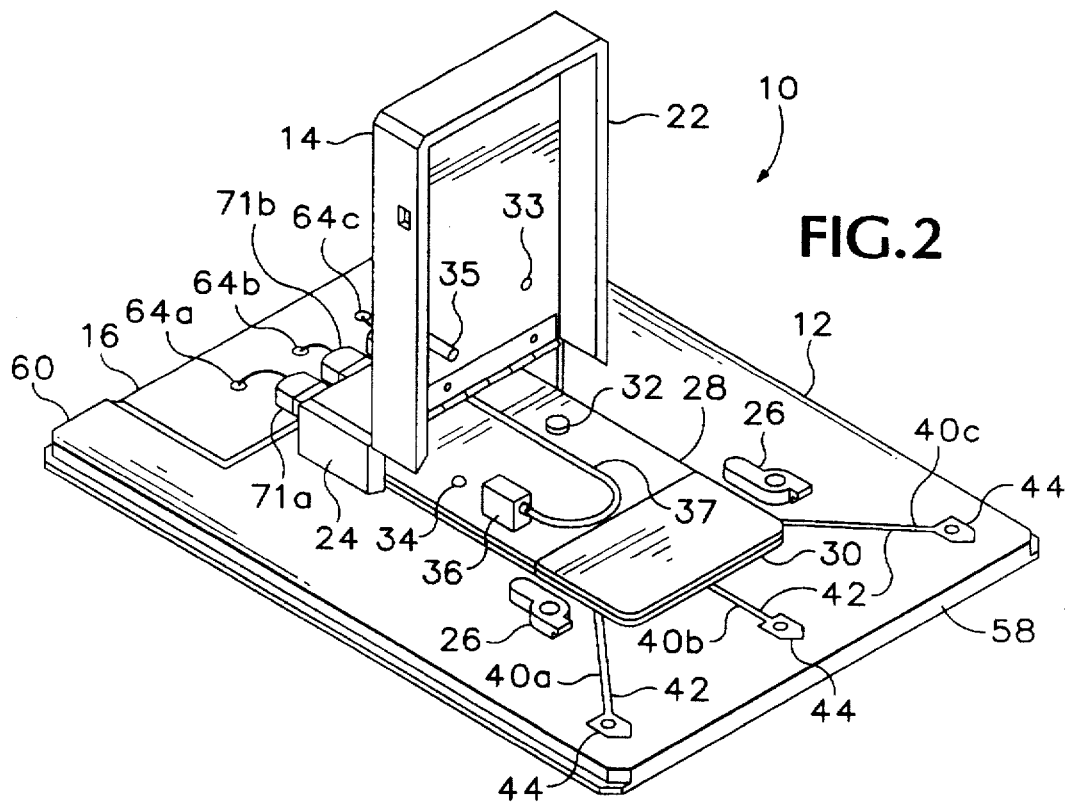
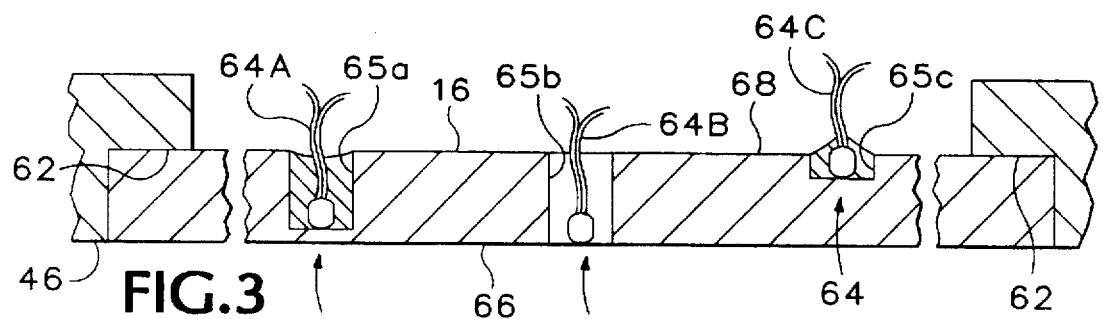
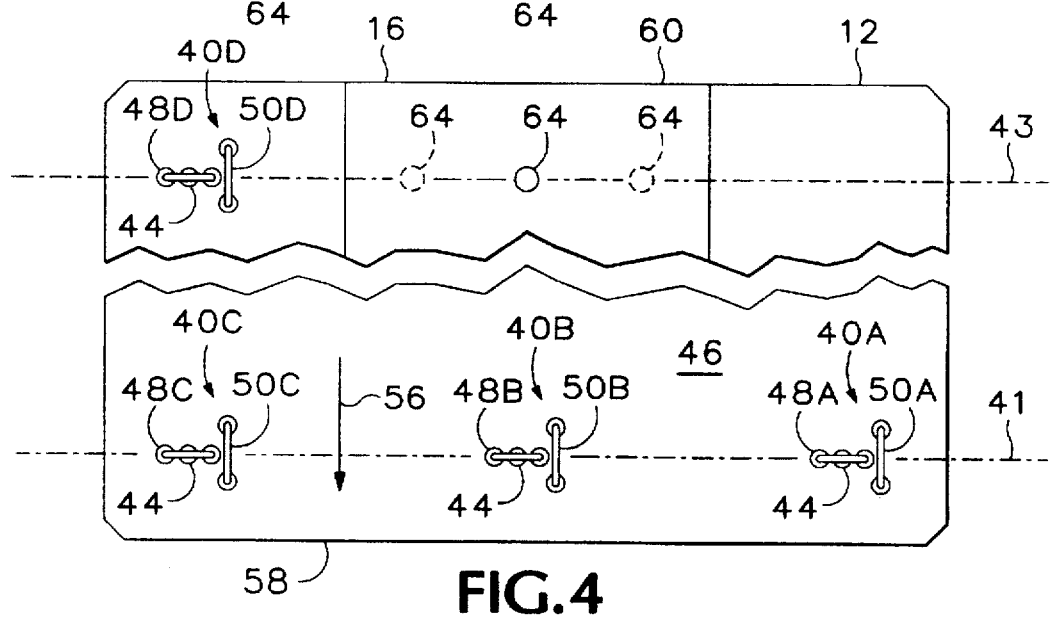

WAVE SOLDER ANALYZER

BACKGROUND OF THE INVENTION

1. Field of the Invention

This invention pertains to test equipment for sensing, collecting and analyzing physical parameters associated with a solder wave of a wave solder machine to facilitate accurate calibration of the machine.

2. Description of the Related Art

U.S. Pat. No. 4,180,199 discloses a control system for measuring time and temperature profiles of a mass soldering operation. The control system includes a circuit board having a piggy-back wireless data transmitter. Temperature sensors connect the data transmitter to components on the circuit board and directly to the circuit board. A probe measures dwell time of the circuit board in the solder. The sensed data is transmitted wirelessly to a remote receiver for display and recording. To change the type of circuit board, e.g., one-sided to two-sided, presumably, it is necessary to disassemble the control system and mount the data transmitter onto a desired circuit board type and reattach the temperature sensors and probe. It appears that the system cannot measure parallelism of the circuit board relative to the solder wave or depth of penetration of the board into the solder.

U.S. Pat. No. 5,023,848 describes a solder wave dwell timer having two metal probes mounted to a bottom surface of the timer. When both probes are in contact with solder, an electrical path is created through the probes and solder. The timer measures the time the electrical path is closed and calculates the dwell time. This system can not determine solder temperature, depth of penetration into the solder, simulate actual circuit board conditions, or measure parallelism.

U.S. Pat. No. 5,338,468 discloses a solder wave analyzer that locates pairs of electrical contacts on four different levels, or steps, in a plate of circuit board material. The circuit board plate passes through a solder wave machine and the solder closes an electrical circuit between contact pairs. A timer measures the time the circuit is closed and a processor can then determine parallelism, depth of penetration of the board into the solder and dwell time. The specification also states that the unit can be provided with means for measuring a preheating temperature. The system does not provide means to measure solder temperature or circuit board temperatures. Nor does it simulate different types of circuit boards or determine speed of the unit through a wave solder machine.

Accordingly, known wave solder analyzers do not address all the problems or provide all of the information needed or desired to fully analyze and calibrate wave solder machines. The primary objective of the present invention, therefore, is to overcome the deficiencies of the prior art.

SUMMARY OF THE INVENTION

The present invention is directed to a solder wave analyzer that accurately and precisely determines physical characteristics of a wave solder machine, stores the information, and outputs the information to a printer or other display module.

In a preferred embodiment, this objective is achieved by providing a pallet that moves through a wave solder machine like a circuit board. The pallet houses an electronic data monitor that connects to multiple sensors that sense the desired data as the pallet passes through a solder wave, and transmits the sensed data to the monitor. The monitor processes the data into useful information and stores it for selective output to a separate display device.

To accurately simulate the conditions of a circuit board, a circuit board coupon is attached to the pallet and sensors are attached to the coupon to sense physical parameters, such as temperatures, that would be seen by a circuit board passing through the wave solder machine.

In a preferred embodiment, the coupon, comprising circuit board material, is provided with embedded temperature-sensing thermocouples that connect to the electronic data monitor. Coupons made from various styles of circuit boards, such as multiple layers, may be provided to simulate different circuit board conditions and configurations. Preferably, the coupon is provided with three thermocouples: one senses the temperature associated with the top of the coupon; a second senses the temperature associated with the bottom of the coupon; and a third is located in a through hole in the coupon to directly sense solder temperature. Temperature data sensed by the thermocouples is collected by, and stored in, the data monitor and used in conjunction with the time and distance information sensed by the pallet sensors (discussed below) to determine temperature characteristics of the solder and circuit board.

The pallet is also provided with sensors. In one embodiment, the pallet sensors are wave contact sensors located at four locations. Three of the sensors are aligned near a leading edge of a pallet. These sensors provide data that the data analyzer can use to determine such information as parallelism, dwell time, duration of contact, and immersion depth. Parallelism is a measure of the parallel alignment between the bottom surface of the analyzer and the crest of a solder wave. Ideally, a circuit board should be parallel to the solder wave.

The fourth pallet sensor is located relatively closer to the trailing edge of the pallet and, in conjunction with one of the three leading edge sensors, can be used to determine conveyor speed.

In a preferred embodiment, the sensor associated with the pallet are dissimilar wire pairs arranged to have exposed portions along a bottom surface of the pallet that contact the solder. Moreover, the exposed portions are substantially linear and separated from, and orthogonal to, one another to facilitate precise measurement.

Each dissimilar wire pair work as a thermocouple when both exposed portions are immersed in solder. Accordingly, by detecting the thermal electromotive force (emf) of the dissimilar wire pairs, the data monitor can determine when and for how long the wire pairs are immersed in solder. From such data, the data monitor can determine the time, distance and other information as discussed above and at length in the detailed description.

Various advantages and features of novelty which characterize the invention are particularized in the claims forming a part hereof. However, for a better understanding of the invention and its advantages, refer to the drawings and the accompanying description in which there is illustrated and described preferred embodiments of the invention.

BRIEF DESCRIPTION OF THE DRAWINGS

FIG. 2 is a perspective view of the wave solder analyzer of FIG. 1 with a housing cover opened to reveal a data monitor/collector.

FIG. 3 is a partial cross-sectional view taken along line 3—3 of FIG. 1.

FIG. 4 is a bottom plan view of the solder wave analyzer of FIG. 1, with a middle section broken away.

DETAILED DESCRIPTION OF PREFERRED EMBODIMENTS

Figure 1:
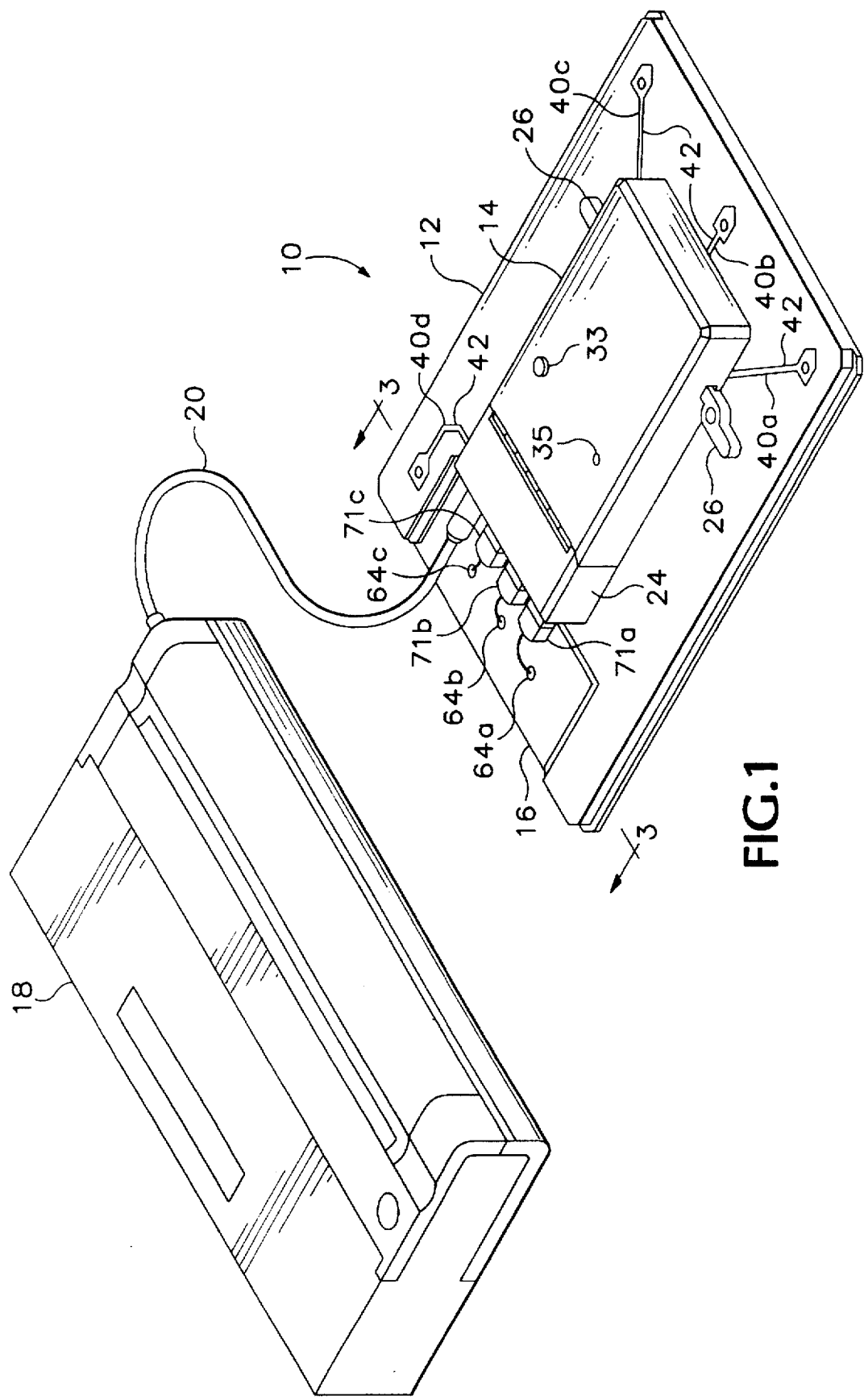
FIG. 1 is a perspective view of a wave solder analyzer of the present invention including both a pallet portion and a separate display portion.

An embodiment of the present invention is shown in FIGS. 1 and 2. A solder wave analyzer 10 includes a pallet 12 that supports a housing 14 and test coupon 16. The wave analyzer includes a separate output or display device, in this case a printer 18, connectable to an output port (not visible) of the housing 14 via a cable 20 so that information collected, processed and stored by the analyzer can be displayed.

As can be seen in FIG. 2, the housing 14 includes a cover 22 hinged to a base block 24 mounted on pallet 12. Latches 26 secure the cover 22 to a closed position.

Within cover 22 is a thin planar data device 28 that monitors, collects, processes and stores information from sensors. The device 28, referred to herein as a data collector 28, has memory and a processor for operating on the collected information. The collector 28 also includes a power supply 30, start/stop button 32 and indicator light 34. The cover 22 includes a button 33 and window 35 for accessing the start/stop button 32 and viewing light 34, respectively. The data collector 28 also has a data output port 36 from which a data cable 37 extends to the output port (not visible) in base block 24 to connect data collector 28 to cable 20 and display printer 18. Data output port 36 can also connect directly to a computer when data cable 37 is removed.

Data collector 28 has a plurality of I/O ports along one edge chat couple to base block 24 to physically plug collector 28 into base block 24. Base block 24 also includes electrical connectors for receiving data sensors as described below. The function of the base block is to provide a terminal on the pallet with connections to receive the data sensors and data collector 28 and properly interconnect the sensors and data collector.

Base block 24 provides the pallet with modularity. That is, the data collector 28 may be replaced without disturbing the sensor connections to the pallet, and coupons 16 may be swapped without disconnecting the pallet sensors or data collector. The base block 24 also includes a port for the printer cable 20, which port is coupled to the data cable 37 which in turn is coupled to the data output port 36.

A suitable data collector 28 is available from Electronic Controls Design, Inc. of Milwaukie, Oreg., and is sold under the trademark SUPER M.O.L.E.™ The M.O.L.E.™ provides six I/O ports along one edge, a data output port, a start/stop switch and an indicator light 20 as described above. The M.O.L.E. also provides sufficient memory to store the collected data and data processing capability sufficient to provide the desired computations to calculate temperature, time and distance information as described herein.

Pallet 12 is preferably fabricated of a material low in thermal conductivity and includes carbon for electrostatic dissipation. In a preferred embodiment, the pallet comprises a glass-reinforced resin that is thermally stable above solder melt points (approximately 350° F. to 500° F.). A suitable pallet material is available from a French company, Von Roll Isola, Inc., with offices in North Clarendon, Vt., sold under the trademark CDM-ESD.

Embedded within pallet 12 are four wave contact sensors comprising dissimilar metal-wire pairs 40a–40d located in pallet channels 42. Near terminal ends of channels 42 air holes 44 vent air that may become trapped between the pallet 12 and the solder wave during testing.

As noted, wire pairs 40a–40d are embedded in pallet 12 along channels 42. With particular reference to FIG. 4, the wire pairs emerge at predetermined locations along a bottom surface 46 of pallet 12. The wire pairs comprise separate conductors 48a–48d and 50a–50d, respectively that are unconnected at their distal ends. The exposed portions of conductors 48a–48d and 50a–50d are substantially linear and arranged orthogonally to one another. Preferably, conductors 50a–50d are common conductors and conductors 48a–48d are signal conductors. Common conductors 50a–50d are arranged to encounter solder before and after the signal conductors 48a–48d encounter solder. This arrangement more precisely triggers and terminates the thermal emf signal generated when both dissimilar conductors are immersed in solder as explained in greater detail below.

Figure 6:
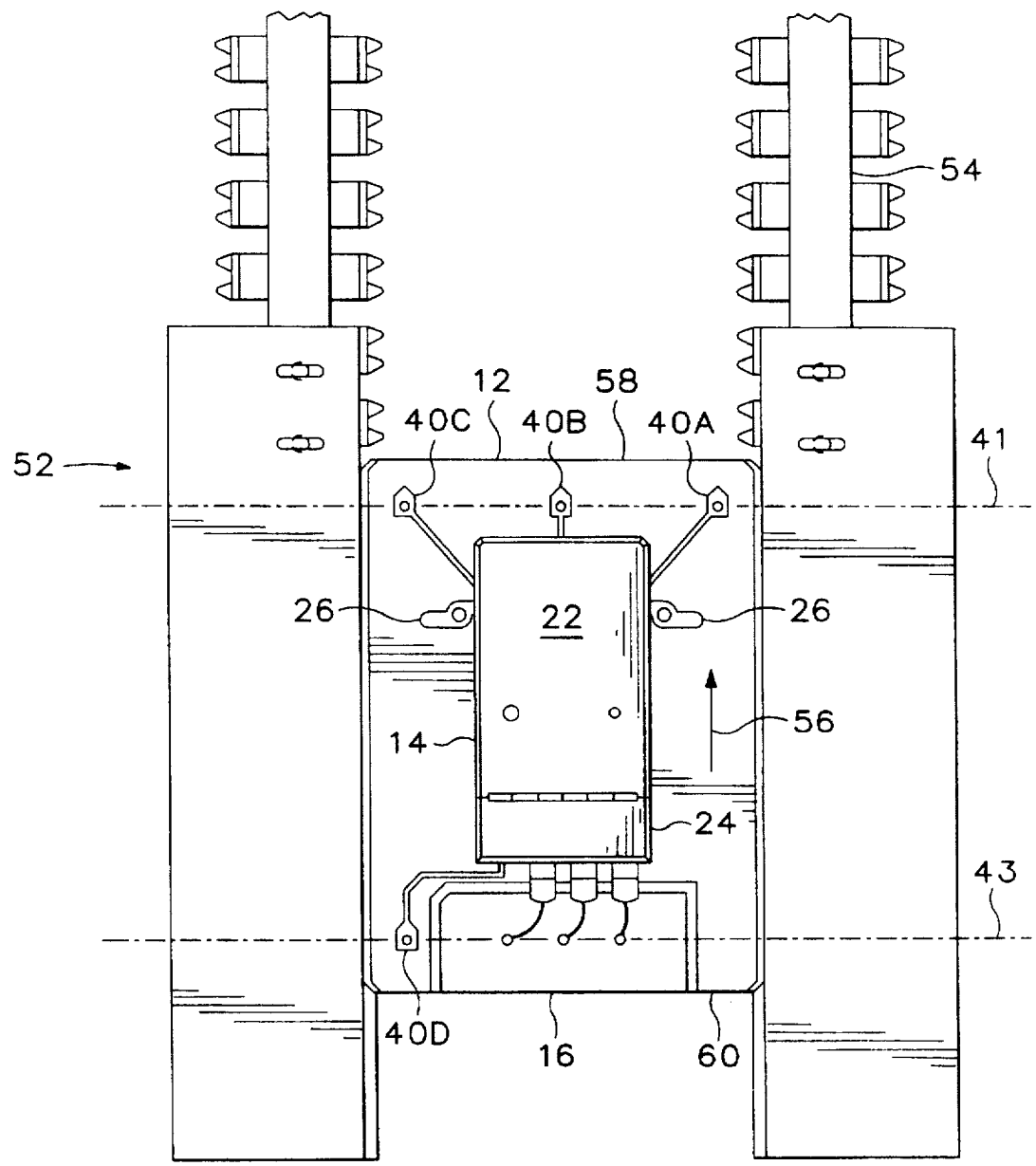
FIG. 6 is a schematic top plan view of a conveyor portion of a wave solder machine with the solder wave analyzer loaded in its operative position thereon.

When the pallet is placed on a wave solder machine, exemplary shown at 52 in FIG. 6, it is propelled by a conveyor 54 to move in a preferred direction as indicated by arrow 56, shown in FIGS. 4 and 6. Thus, the direction of movement defines a leading edge 58 and a trailing edge 60 of the pallet. A typical wave solder machine comprises three stations; preheat, flux and solder wave.

When the pallet encounters a solder wave, the conductors 50a–50d contact the solder prior to respective conductors 48a–48d. When both dissimilar conductors 48a–48d and 50a–50d of each pair 40a–40d are immersed in solder, the dissimilar conductor pairs 40a–40d form thermocouples and generate a thermal emf that is detected, processed and stored as useful information by data collector 28. Air that may be trapped between the solder wave and the bottom surface of pallet 12 in the vicinity of the exposed portions of the conductive pairs 40a–40d can be expelled through air holes 44 to ensure that the conductor solder contact is stable and uninterrupted.

The exposed portions of common conductors 50a–50d are elongate and oriented so their longitudinal axes are substantially parallel to the direction of travel indicated by arrow 56. The exposed portions of signal conductors 48a–48d are likewise elongate and oriented so their longitudinal axes are substantially orthogonal to the direction of travel. While this configuration is preferred, other configurations would also be suitable, most notably, wherein the orientations of the common and signal conductors are reversed, with the exposed common conductors oriented orthogonally to the direction of travel and the exposed signal conductors oriented parallel to the direction of travel. Likewise, different venting options are available, and the sensors work satisfactorily without venting.

Preferably, wire conductors 48a–48d are positive conductors of a type k thermocouple and conductors 50a–50d are negative conductors of a type k thermocouple, although other combinations of conductive wires are suitable.

The coupon will now be described further. Sensors are also mounted on coupon 16, more particularly, three temperature sensors 64a–64c (collectively sensors 64). As noted briefly above, coupon 16 is removably coupled to pallet 12 near the pallet's trailing edge 60. As shown particularly in FIG. 3, coupon 16 is received within slots 62 of pallet 12. The coupon may be held in place by fastener-mounted strips (not shown) that couple directly to the pallet and hold the coupon in place. Other available fastening means may also be used. Preferably, the coupon is made of printed circuit board material and may be single-sided, double-sided or multi-layered to accurately simulate a circuit board and the response of a circuit board to the conditions it will encounter in the wave solder machine.

Coupon 16 is provided with three thermocouples 64a–64c collectively referred to as thermocouples 64. As shown best in FIG. 3, thermocouple 64a is mounted in a deep hole 65a in the coupon that terminates just short of a coupon bottom surface 66 for sensing a temperature at, or close to, the bottom surface of the coupon. A second thermocouple 64b is mounted in a through hole 65b in the coupon and is exposed so that it directly contacts the solder wave and thereby senses the temperature of the solder itself. A third thermocouple 64c is mounted in a shallow hole 65c in the coupon so it senses temperatures near a top surface 68 of the coupon. Preferably, thermocouples 64a–64c are located in-line with the exposed portion of pallet sensor wire pair 40d. That way, the data collector 28 can sense when the thermocouples 64 are at the solder wave by monitoring the condition of the emf voltage produced by the dissimilar wire pair 40d. When wire pair 40d is immersed in the solder, thermocouples 64a and 64c will be located above the solder wave, and thermocouple 64b will be in contact with the solder.

Figure 5:
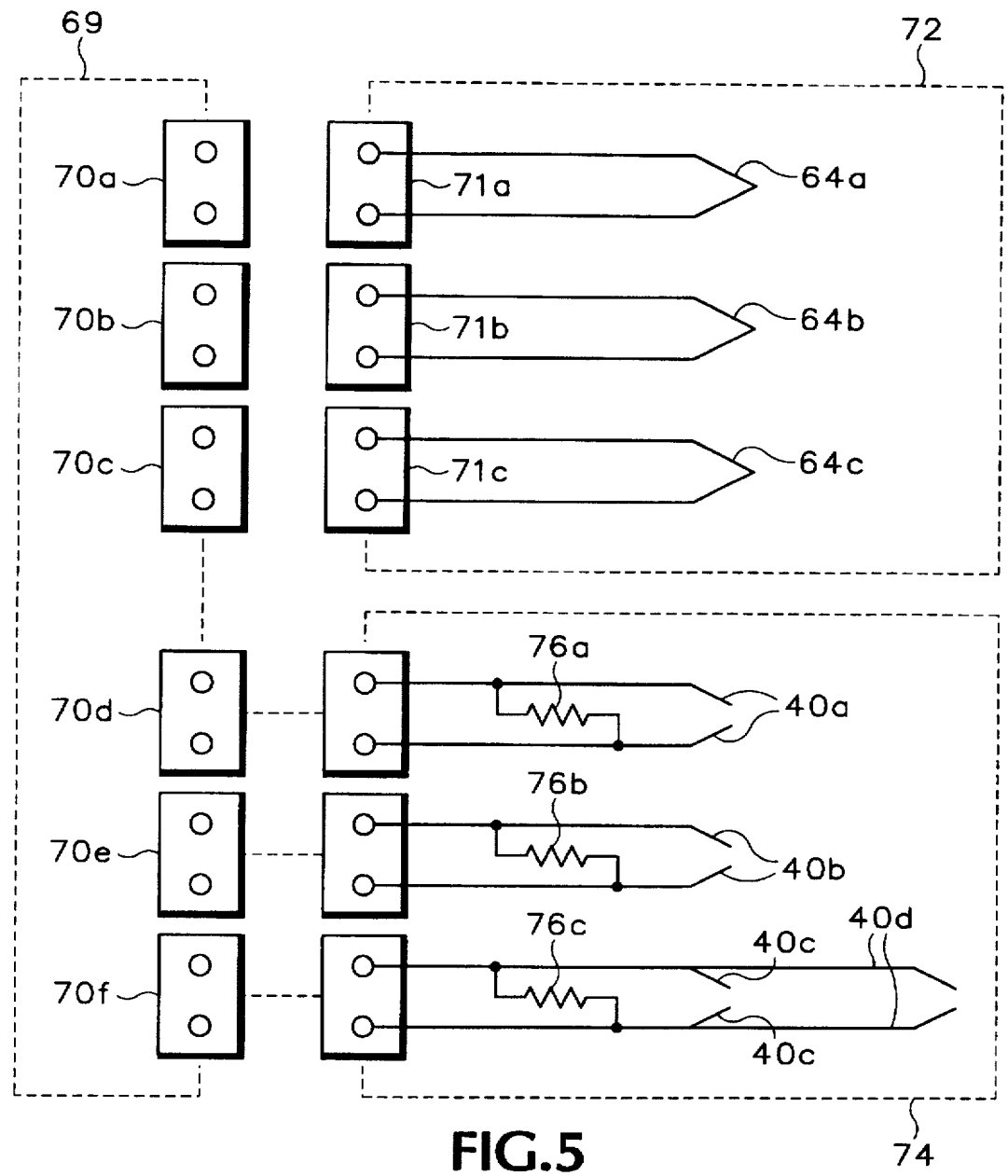
FIG. 5 is a schematic electrical representation of the electrical connections of the wave solder analyzer shown in FIG. 1.

A schematic representation of the electronics on the pallet and coupon is shown in FIG. 5. Data collector 28 is represented by dashed lines 69 and the collector's I/O ports are shown at 70a–70f. Coupon 16 is represented by dashed lines 72 and is shown with thermocouples 64a–64c which are electrically connected to I/O ports 70a–70c, at connectors 71a–71c, respectively.

The pallet is represented by dashed lines 74 and includes the dissimilar wire pairs 40a–40d. As shown in this embodiment, wires 40c and 40d are coupled pairs and share the I/O port 70f. This is possible because the exposed portions located at the ends of respective wire pairs 40c and 40d are located near opposite ends of pallet 12 and will not encounter the solder wave at the same time. Doubling up the wire pairs on the same I/O port permits more sensors to be used than there are I/O ports, which are limited in number.

The dissimilar conductors 48a–48d and 50a–50d respectively, are connected through resistors 76a–76c as shown. The resistors prevent potential from building in the dissimilar wire pairs. The resistors do not affect the data readings because the impedance in conductors 48a–48d and 50a–50d is much lower than the impedance of the resistors. Preferably a 100 ohm resistor is used. The resistors also shield the system from the effects of electrical noise associated with conductive flux. In addition, the collector 28 of the preferred embodiment (the Super M.O.L.E. as described above) includes pull-up circuits that are electrically in-line with the sensors. Thus, the resistors shunt the effects of the pull-up circuits to prevent false readings and reduce the effects of noise.

Data collector 28 monitors the wire pairs 40a–40d for significant changes in thermal emf. The collector compares thermal emf at sequential data samples. When the collector senses a change in sequential thermal emf readings that is, for example, equivalent to a 50° F. temperature change, the collector determines that conductors 48a–48d and 50a–50d are immersed in solder because the significantly higher solder temperature triggers a significant change in thermal emf. By using the change in thermal emf as a data point to determine when the wire pairs are immersed, the analyzer avoids false readings due to conductive flux and convection heat.

Operation

In operation, pallet 12 is placed on conveyor 54 of a wave solder machine as shown in FIG. 6. The direction of travel 56 determines the pallet's leading edge 58 and trailing edge 60. The alignment of sensors 40a–40c near leading edge 58 creates a first detection axis 41 that is orthogonal to the direction of travel. When that first detection axis reaches the solder wave, the leading edge of common conductors 50a–50c is immersed in the solder. Shortly thereafter, signal conductors 48a–48c are immersed, thereby electrically coupling respective conductors 50a–50c and 48a14 48c, creating a thermal emf in the dissimilar wire pairs 40a–40c. This thermal emf is detected and monitored by data collector 28, and the duration of the thermal emf is measured. From this information the data collector can calculate or otherwise determine the following information useful for calibrating the wave solder machine:

Dwell time: This is the time that a given point on the bottom of the pallet remains in the solder wave. This is determined by measuring the length of time that each dissimilar wire pair 40a–40c is in contact with the solder wave.

Parallelism: This is the dwell time at sensor 40c minus the dwell time at sensor 40a. When the pallet is parallel to the top of the solder wave, the dwell time at these wire pair sensors will be the same. A difference between the dwell times of these sensors indicates a lack of parallelism, and may indicate an adjustment is necessary.

As the pallet continues along the conveyor through the solder wave, the trailing wire pair 40d eventually contacts the solder wave. Recall that wire pair 40d is transversely in-line with temperature sensors 64a–64c of the coupon, thus establishing a second detection axis 43 (see FIGS. 4 and 6), also orthogonal to the direction of travel. When the wire pair 40d is immersed, the data collector determines the thermal emf, and hence the temperatures, at coupon thermocouples 64a–64c. In addition, the data collector determines the elapsed time between the solder wave contact of wire pair 40c and the wire pair 40d. With this information, the data collector can determine the following:

Maximum preheat temperature: This is the highest temperature at thermocouple 64c prior to immersion of the wire pair 40d in the solder wave. This indicates the preheat temperature that a circuit board would encounter in the wave solder machine.

Minimum preheat temperature: This temperature is determined at thermocouple 64c at the beginning of the test cycle before the pallet is moved through the wave solder machine.

Maximum slope: This is the largest absolute value temperature slope between the minimum preheat temperature and the maximum preheat temperature.

Conveyor speed: Calculated by dividing the distance between the wire pairs 40c and 40d by the time between immersion of the wire pair 40c and immersion of the wire pair 40d.

Delta temperature at wave: This is the maximum temperature sensed by thermocouple 64c after the wire pair 40d passes the solder wave, minus the maximum preheat temperature. This records the temperature effect of the solder wave on the top side of a circuit board.

Wave temperature: This is the maximum temperature at thermocouple 64b as determined anytime after wire pair 40d contacts the solder wave.

Contact length: This is the dwell time at wire pairs 40a–40c times the conveyor speed. This indicates the total length of circuit board in contact with the solder wave at any given instant while the board is in contact with the wave.

Immersion depth: This is a function of contact length and is calculated based upon standard solder wave shapes.

The data collector can also be programmed to monitor and collect many other variables such as lowest temperature from start-to-stop, maximum temperature from start-to-stop, minimum temperature increase, maximum temperature increase and total time the pallet is exposed to temperatures above a solder melting point. Such parameters can be useful in trouble shooting problems with solder wave machines.

Numerous features, characteristics and advantages of the invention have been set forth in the foregoing description, together with details of the structure and function of the invention. The disclosure is illustrative only, and changes may be made in arrangement and detail, especially in matters of shape, size, and arrangement of parts, without departing from the true spirit and scope of the invention as defined by the following claims:

We claim:

1. A wave solder analyzer for determining characteristics of a wave solder machine, comprising:
   (a) a pallet having a top surface and a bottom surface;
   (b) a coupon coupled to the pallet, the coupon having a thickness, a top surface and a bottom surface;
   (c) a sensor coupled to the coupon; and
   (d) at least a first conductor pair having first and second dissimilar conductors, wherein each conductor has an exposed portion located along the bottom surface of the pallet and wherein the exposed portions are electrically isolated from each other so that contact of the dissimilar conductors with solder creates a thermal emf when the dissimilar conductors are in such contact.

2. The analyzer of claim 1 further comprising a sensor located proximate the coupon top surface for determining a physical parameter associated with a solder wave near the top of the coupon, and a sensor located proximate the coupon bottom surface for determining a physical parameter associated with a solder wave near the bottom of the coupon.

3. The analyzer of claim 1 wherein the sensor is located in a through hole in the coupon so as to come into direct contact with the solder when the analyzer travels through a wave solder machine.

4. The analyzer of claim 1 wherein the sensor is a thermocouple.

5. The analyzer of claim 1 wherein the coupon is a printed circuit board.

6. The analyzer of claim 1 wherein the first and second conductors have respective first and second exposed portions located along the bottom surface of the pallet wherein the exposed portions are substantially elongate and linear and the first exposed portion is substantially orthogonal to the second exposed portion.

7. The analyzer of claim 1 further comprising second and third conductor pairs having dissimilar conductors, each conductor having an exposed portion located along the bottom surface of the pallet and arranged such that each conductor pair becomes a thermocouple when in contact with solder, the second and third conductor pairs arranged along a detection axis and wherein the pallet has a preferred direction of travel in a wave solder machine and the detection axis is substantially orthogonal to the preferred direction of travel so that as the pallet passes through a solder wave machine the second and third conductor pairs pass through a solder wave and sense dwell time and parallelism of the pallet.

8. The analyzer of claim 1 further comprising a second conductor pair, having dissimilar conductors and each conductor having an exposed portion located proximate the bottom of the pallet, the pallet having a preferred direction of travel in a wave solder machine thereby defining a leading edge and a trailing edge, the first conductor pair exposed portions arranged relatively proximate the leading edge and the second conductor pair exposed portions located relatively proximate the trailing edge and the respective exposed portions arranged so as to form a thermocouple when the exposed portions are immersed in solder thereby enabling the analyzer to detect a speed of the pallet through a solder wave.

9. The analyzer of claim 1 further comprising a thermocouple located substantially midway between the top surface and the bottom surface for determining a temperature within the coupon.

10. The analyzer of claim 1 wherein the first and second dissimilar conductors are orthogonal to each other and the pallet includes a leading edge and a trailing edge, the first conductor being closer to the leading edge than the second conductor.

11. The analyzer of claim 1 wherein the pallet has a preferred direction of travel through a wave solder machine thereby defining a leading edge and a trailing edge and further comprising second and third conductor pairs, each conductor pair having at least two dissimilar conductors and each conductor having an exposed portion along the bottom surface of the pallet, wherein the first and second conductor pair exposed portions are aligned proximate the leading edge and the third conductor pair exposed portions are located relatively proximate the trailing edge whereby the analyzer can be placed on a wave solder machine and when the exposed portions of a conductor pair are in contact with the solder the conductor pair form a thermocouple and the analyzer can determine dwell time of a point on the bottom surface of the pallet in the solder, parallelism of the pallet to the solder wave and speed of the pallet relative to the solder wave.

12. The analyzer of claim 11 further comprising an electronic data module coupled to the conductor pairs for monitoring and recording temperature data.

13. The analyzer of claim 11 further comprising a standard thermocouple positioned on the coupon and an electronic data module having memory that is coupled to the standard thermocouple and the conductor pairs for monitoring and recording respective sensed information.

14. The analyzer of claim 13 wherein the data module samples signals from the conductor pairs and when the signals from separate samples are different by a predetermined amount, the data module determines that the conductor pairs are immersed in solder.

15. A wave solder analyzer for determining characteristics of a wave solder machine, comprising:
   (a) a pallet having a bottom surface and a longitudinal axis and an orthogonal lateral axis; and
   (b) at least one dissimilar conductor pair, the conductor pair comprising a first conductor arranged so as to have a first portion exposed along the bottom surface and a second conductor arranged so as to have a second portion exposed along the bottom surface and separated so as to be electrically isolated from the first portion such that contact of the first portion and second portion with solder generates a thermal emf whereby the analyzer determines immersion of the exposed portions in the solder wave.

16. The analyzer of claim 15 wherein the pallet includes a leading edge and wherein a conductor pair is located proximate the leading edge of the pallet.

17. The analyzer of claim 15 wherein the first portion is substantially linear and substantially aligned with the longitudinal axis and the second portion is substantially linear and substantially aligned with the lateral axis.

18. The analyzer of claim 15 wherein the first and second portions are substantially linear and are arranged substantially orthogonal to each other.

19. The analyzer of claim 15 further comprising a coupon coupled to the pallet, the coupon comprising printed circuit board material.

20. The analyzer of claim 15 further comprising a coupon coupled to the pallet, and further comprising at least one sensor coupled to the coupon for sensing a physical parameter associated with the coupon when it passes through a wave solder machine.

21. The analyzer of claim 15 further comprising a coupon coupled to the pallet and further comprising first and second sensors, the first sensor coupled proximate a coupon top surface and the second sensors coupled proximate a bottom surface of the coupon for determining a physical parameter associated with the top and bottom surfaces, respectively.

22. The analyzer of claim 15 further comprising an electronic data module coupled to the pallet and in communication with the dissimilar conductor pair, the data module further having memory for retaining data.

23. The analyzer of claim 22 wherein the data module determines when the first portion and second portion contact solder by detecting a change in thermal emf.

24. A wave solder analyzer for determining characteristics of a wave solder machine, comprising:

(a) a pallet having a top surface and a bottom surface;

(b) a coupon coupled to the pallet, the coupon having a top surface and a bottom surface;

(c) a first sensor for sensing a first parameter associated with a solder wave comprising a first dissimilar wire pair comprising a first wire having a sensor portion located proximate the pallet bottom surface for contacting a solder wave and a second wire having a sensor portion located proximate the pallet bottom surface, and electrically isolated from the first wire on the bottom surface; and (d) a second sensor comprising a standard thermocouple located on the coupon for sensing a second parameter associated with a solder wave.

25. The analyzer of claim 24 further comprising an electronic data analyzer including a power source, a CPU and a data memory.

26. The analyzer of claim 24 wherein the wave solder analyzer senses a signal associated with the thermocouple when the wire pair sensor portions are immersed in solder.

27. The analyzer of claim 24 further including second and third dissimilar wire pairs having sensor portions located along a detection axis that is substantially orthogonal to a direction of travel of the pallet in a wave solder machine and a fourth wire pair having a sensor portion located away from the detection axis.

28. The analyzer of claim 24 further including second and third wire pairs having sensor portions located along a detection line that is substantially orthogonal to a direction of the motion of the pallet in a wave solder machine.

29. The analyzer of claim 28 wherein the sensor portions of each wire pair are substantially elongate and are oriented substantially orthogonal to the other of each respective pair.

30. A solder wave analyzer for analyzing a solder wave of a wave solder machine, comprising:

(a) a pallet movable through the solder wave, the pallet having a direction of travel and a transverse axis that separates first and second portions of the pallet;

(b) a temperature sensor carried by the pallet and located in the first portion for measuring temperature at the temperature sensor as the temperature sensor travels past the wave; and (c) at least two wave contact sensors carried by the pallet, the wave contact sensors formed from at least two dissimilar conductors electrically isolated from each other, one wave contact sensor located in the second portion and one wave contact sensor located in the first portion, the wave contact sensors sensing when the wave contact sensors engage and disengage a solder wave and wherein the wave contact sensor in the first portion signals when the temperature sensor is proximate the solder wave.

31. The analyzer of claim 30 wherein the wave contact sensor and temperature sensor in the first portion are located along a first detection axis and at least two wave contact sensors are located in the second portion and are arranged along a second detection axis.

32. The analyzer of claim 30 further comprising a plurality of temperature sensors located in the first portion and the temperature sensors and the wave contact sensor are arranged along a detection axis.

33. The analyzer of claim 30 wherein at least two wave contact sensors are located in the second portion and the pallet includes a leading edge margin located in the second portion, the leading edge margin defined by the direction of travel.

34. The analyzer of claim 30 wherein three wave contact sensors are located in the second portion along a linear second detection axis and three temperature sensors and one wave contact sensor are located in the first portion along a linear first detection axis and the first and second detection axes are substantially orthogonal to the direction of travel.

* * * * *